United States Patent
Rang

(10) Patent No.: US 12,197,740 B2
(45) Date of Patent: Jan. 14, 2025

(54) WEAR-BALANCING ACROSS STORAGE DEVICES BASED ON ENDURANCE MEASUREMENT

(71) Applicant: Dell Products L.P., Hopkinton, MA (US)

(72) Inventor: Anton Rang, Houlton, WI (US)

(73) Assignee: Dell Products L.P., Hopkinton, MA (US)

( * ) Notice: Subject to any disclaimer, the term of this patent is extended or adjusted under 35 U.S.C. 154(b) by 31 days.

(21) Appl. No.: 17/944,270

(22) Filed: Sep. 14, 2022

(65) Prior Publication Data

US 2024/0086073 A1    Mar. 14, 2024

(51) Int. Cl.
*G06F 3/06* (2006.01)

(52) U.S. Cl.
CPC .......... *G06F 3/0616* (2013.01); *G06F 3/0647* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,811,288 B1 * | 11/2017 | Chen | G06F 3/0679 |
| 10,228,868 B1 * | 3/2019 | Liang | G06F 3/0653 |
| 2015/0058530 A1 * | 2/2015 | Reddy | G06F 3/0679 |
| | | | 711/103 |
| 2020/0097186 A1 * | 3/2020 | Johnson | G06F 3/064 |
| 2022/0035535 A1 * | 2/2022 | Van De Graaff | G11C 11/4076 |

* cited by examiner

*Primary Examiner* — Michael Alsip
(74) *Attorney, Agent, or Firm* — Anderson Gorecki LLP

(57) ABSTRACT

A storage system calculates relative writability of SSDs and biases storage of data from write IOs to the SSD that has the greatest relative writability, where writability is a value calculated as a function of remaining wear-life and drive capacity. When the remaining wear-life of an SSD falls below a threshold, unstable data is evicted from that drive, where data stability is an indication of likelihood of data being changed. The drive with the greatest relative writability is selected as the target for the unstable data. The drive with the greatest relative writability is also selected as the donor for stable data that is moved to the free space created by eviction of the unstable data. Consequently, the SSD that triggers the low wear-life threshold processes fewer write IOs.

9 Claims, 2 Drawing Sheets

WEAR-BALANCING ACROSS STORAGE DEVICES BASED ON ENDURANCE MEASUREMENT

TECHNICAL FIELD

The subject matter of this disclosure is generally related to wear-balancing of solid-state drives in data storage systems.

BACKGROUND

Data storage systems such as storage area networks (SANs), network-attached storage (NAS), and software-defined and disaggregated variants thereof can maintain storage objects for use by instances of host applications running on clusters of host servers. Such data storage systems include arrays of individual disk drives such as solid-state drives (SSDs) based on electrically erasable programmable read-only memory (EEPROM) technology such as NAND and NOR flash memory. An SSD has a finite service life that is related to performance of input-output operations (IOs) that change data, e.g., writes. In order to change data, SSDs erase existing blocks of data and write new data to a different page. Those operations require program/erase (P/E) cycles. SSD memory cells are expected to fail after a certain number of PIE cycles. An SSD is considered to be failed after a certain number or percentage of memory cells fail. SSD expected lifetime from new may be expressed as an endurance rating in units of drive writes per day (DWPD) that can be sustained for a certain time period such as 5 years. In general, SSDs with relatively high DWPD endurance ratings are more costly than SSDs with relatively lower DWDP endurance ratings. At least some SSDs are configured to provide an indication of remaining service life, e.g., in terms of the remaining percentage of lifetime write capability.

SUMMARY

All examples, aspects, and features mentioned in this document can be combined in any technically possible way.

In accordance with some implementations, a method comprises: calculating writability of each of a plurality of drives of a drive array; calculating relative writability of each of the plurality of drives relative to other ones of the plurality of drives such that at least a first one of the plurality of drives has greatest relative writability; and selecting the first drive as a target for write IOs based on relative writability.

In accordance with some implementations, an apparatus comprises: a plurality of drives; and a compute node comprising a processor, memory, and an operating system with an embedded filesystem configured to: calculate writability of each of a plurality of drives of a drive array; calculate relative writability of each of the plurality of drives relative to other ones of the plurality of drives such that at least a first one of the plurality of drives has greatest relative writability; and select the first drive as a target for write IOs based on relative writability.

In accordance with some implementations, a non-transitory computer-readable storage medium stores instructions that when executed by a computer cause the computer to perform a method comprising: calculating writability of each of a plurality of drives of a drive array; calculating relative writability of each of the plurality of drives relative to other ones of the plurality of drives such that at least a first one of the plurality of drives has greatest relative writability; and selecting the first drive as a target for write input-output operations (IOs) based on relative writability.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors. The terms "disk" and "drive" are used interchangeably and are not intended to be limited to a particular type of non-volatile data storage media.

Figure 1:
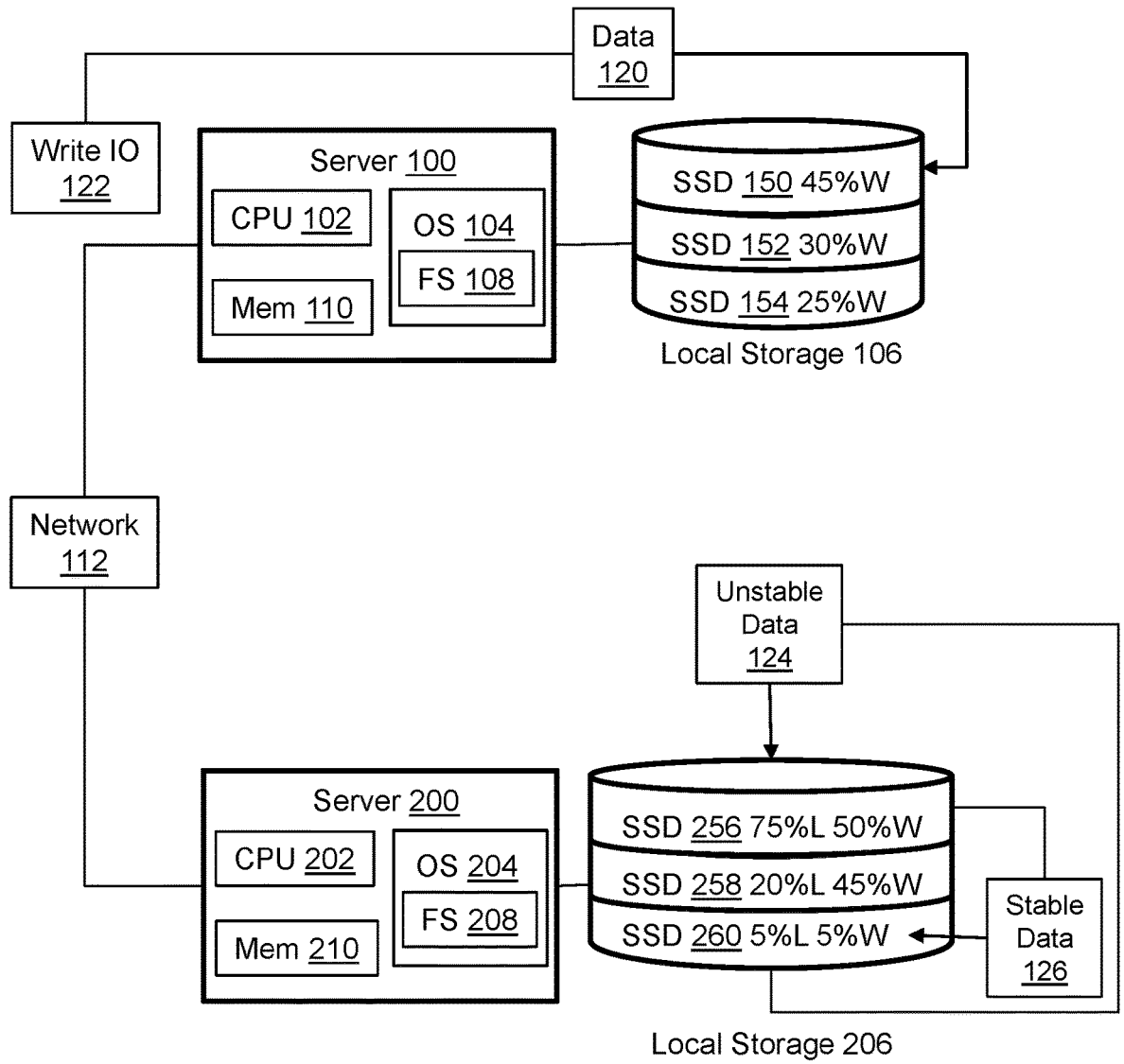
FIG. 1 illustrates a storage system in which embedded filesystems are configured to select target drives for placement of data associated with write IOs based on drive writability and relocate data between drives based on remaining wear-life and data stability.

FIG. 1 illustrates a storage system in which embedded filesystems are configured to help select target drives for placement of data associated with write IOs based on drive writability and relocate data between drives based on remaining wear-life and data stability. The data storage system includes servers 100, 200 that are interconnected via a network 112. Each server 100, 200 includes a respective multi-core CPU 102, 202, memory bank 110, 210, and operating system (OS) 104, 204, with an embedded filesystem 108, 208. The CPUs include L1 onboard cache. The memory banks include L2/L3 cache and main memory implemented with one or both of volatile memory components such as double data rate synchronous dynamic random-access memory (DDR SDRAM), and non-volatile memory (NVM) such as storage class memory (SCM). Each server 100, 200 manages access to respective non-volatile local storage 106, 206 that is directly connected to the server or network-attached, e.g., via Ethernet using an NVMeoF protocol. The local storage may include, for example, and without limitation, an array of SSDs. The storage system may be scaled-up by adding individual servers with associated local storage.

Each filesystem 108, 208 periodically queries the SSDs of its respective local storage 106, 206 to obtain the remaining wear-life of each SSD. For example, filesystem 108 queries SSDs 150, 152, 154. The SSDs may report their remaining wear-life in terms of the remaining percentage of total lifetime endurance. For example, an unused SSD would report 100% remaining wear-life at the rated DWPD and an SSD reporting 5% remaining wear-life at the DWPD would be approaching end-of-life. The filesystems use the reported remaining wear-life percentages to calculate values that represent the writability of each of the SSDs. SSD writability may be calculated as the product of the remaining wear-life percentage of the SSD and the storage capacity of the SSD, where the storage capacity includes both utilized and unutilized storage space. Thus, SSD writability may be expressed in the same units as storage capacity. The filesystems use the calculated SSD writability values to calculate the relative writability (% W) of each SSD, which represents the portion of the total writability of all local storage that is attributable to that SSD. In the illustrated example, SSD 150 has forty five percent of the writability of local storage 106, i.e., 45% W, and SSD 152 and SSD 154 have 30% W and 25% W, respectively. The filesystems periodically recalculate the relative writability of each of the SSDs in local storage.

The filesystems use relative writability to determine where to place data associated with write IOs to implement balancing. More specifically, data associated with new write IOs is placed on the SSD or SSDs having the greatest relative writability, and balancing is based on relative writability. In the illustrated example, data 120 is associated with a write IO 122. Filesystem 108 places data 120 on SSD 150 because the relative writability of 45% W is the greatest relative writability of any SSD of local storage 106, i.e., greater than the 30% W on SSD 152 and 25% W on SSD 154. If multiple SSDs have the same relative writability, i.e., the same % W, then data associated with new write IOs may be balanced across those SSDs.

The filesystems use relative writability and remaining wear-life reported by the SSDs to relocate data in order to prolong SSD lifespan. Data relocation relieves SSDs that are near end-of-life from responsibility for performing at least some writes that would otherwise be performed. Relocation may be ongoing or initiated in response to a trigger condition such as remaining wear-life reaching a predetermined threshold. In the illustrated example, SSD 260 reports a remaining wear-life of 5%, which prompts filesystem 208 to perform data relocation based on a 5% wear-life threshold. The filesystem maintains or obtains data stability information that indicates the likelihood of individual extents of data in local storage 206 being changed. The data stability information may be quantified for individual extents or used for binary characterization of extents as being either stable or unstable, where stable data is less likely than unstable data, or just unlikely, to be changed and unstable data is more likely, or just likely, to be changed. The filesystem 208 moves all unstable data 124 out of the triggering SSD 260. The filesystem subsequently or contemporaneously moves stable data 126 into the freed storage space on the triggering SSD 260. The unstable data may be moved to any of the SSDs that have not triggered relocation of stable data away from themselves. However, in some implementations the target for the unstable data is the SSD or SSDs having the greatest relative writability. In the illustrated example, unstable data 124 is moved to SSD 256 because 50% W is greater than 45% W. The stable data to be moved onto the triggering SSD may be selected from any of the SSDs that have not yet triggered relocation of stable data onto themselves. However, in some implementations the stable data is selected from the SSD or SSDs having the greatest relative writability. In the illustrated example, stable data 126 is selected to be moved out of SSD 256 because 50% W is greater than 45% W.

Figure 2:
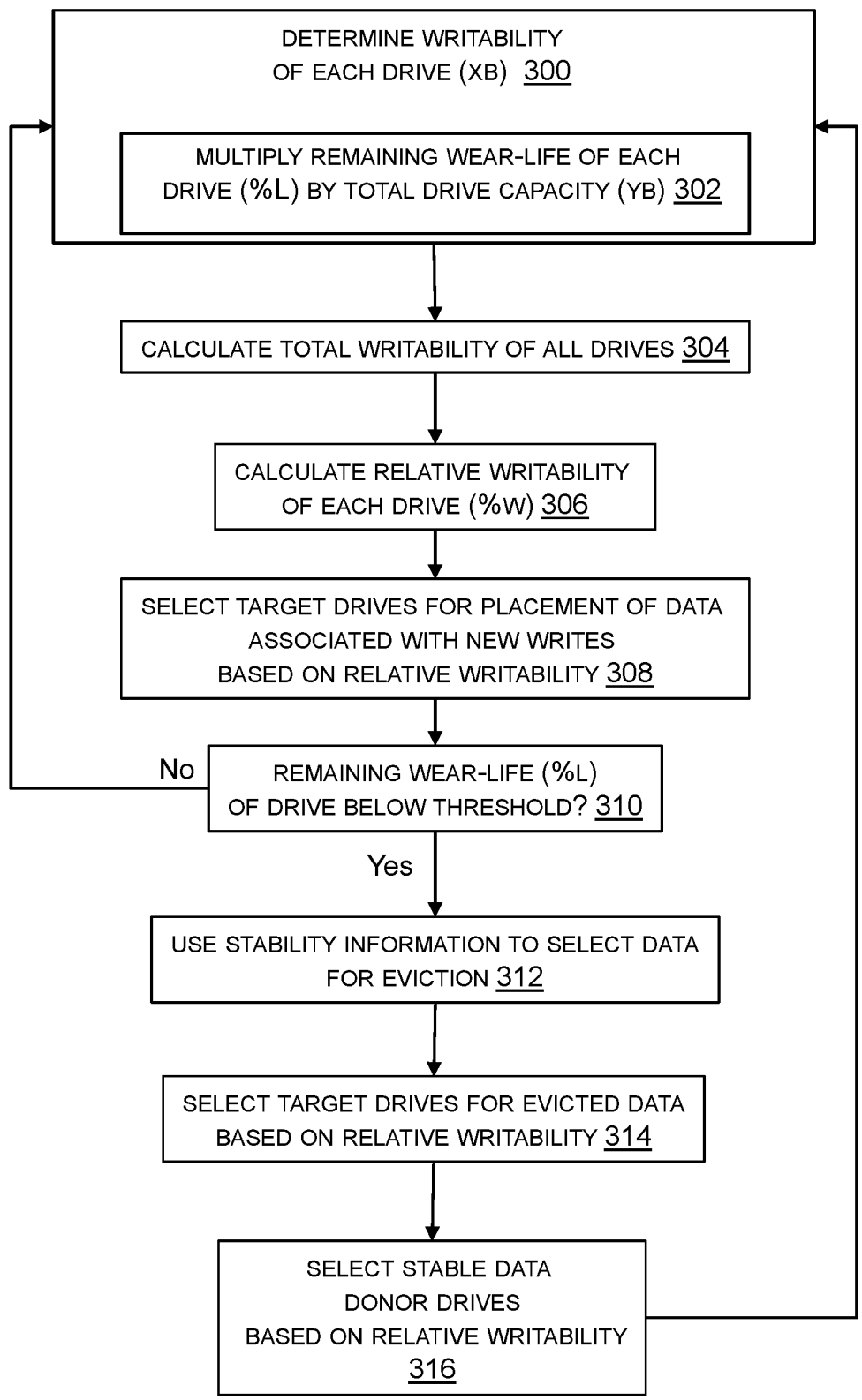
FIG. 2 illustrates a process implemented by each of the embedded filesystems of FIG. 1.

FIG. 2 illustrates a process implemented by each of the embedded filesystems of FIG. 1. Step 300 is determining the writability of each SSD. SSD writability may be calculated by multiplying the remaining wear-life (% L) of the SSD by the total storage capacity (Bytes) of the SSD without regard for current utilization as indicated in step 302. Step 304 is calculating the total writability of all SSDs in local storage. This may be accomplished by summing the individual SSD writability values calculated in step 300. Step 306 is calculating the relative writability of each SSD. This may be accomplished by dividing each of the individual SSD writability values calculated in step 300 by the total writability calculated in step 304. Separate relative writability values are calculated for each SSD. Step 308 is targeting placement of data associated with new write IOs to SSDs based on the relative writability values calculated in step 306. Specifically, the data is placed on the SSD or SSDs that have the greatest relative writability and other SSDs are excluded from being targets. If the target SSD is fully utilized, then the SSD having the next greatest relative writability and free space is selected.

Step 310 is determining whether any of the SSDs has a remaining wear-life value (% L) that is below a threshold for triggering data relocation. Only those SSDs that have not previously had % L below the threshold such that their data was relocated are considered. If none of the SSDs satisfy the threshold, then flow returns to step 300. If an SSD satisfies the threshold, then step 312 is using data stability information to select data for eviction from the SSD that satisfied the trigger threshold. Filesystems with redundant block arrays such as a redundant array of independent disks (RAID) may track data accesses and maintain a "heat map" of data access frequency by extent. Such a heat map can be filtered to ignore read IOs so that only write IOs are used to calculate the stability or relative stability of extents of data in local storage. Data structure type can also or alternatively be used to indicate data stability or relative stability. A filesystem may maintain a journal of changes, which is common for crash recovery purposes. Journals are frequently updated and, depending on their implementation, may require many small writes that overwrite older journal data. Journals are therefore inherently unstable data structures. Similarly, databases or files containing filesystems for virtual machines tend to be written more frequently and more randomly than video files. Such files and data structures can be identified either through tracking access patterns or through analyzing their names or content. It is assumed that either a heat map for writes (which may be at either block or file granularity), filename, or other stability information indicative of likelihood of being rewritten in the future is available. Data that is likely to be changed, and thus unstable according to a definition adopted as a design implementation, is selected for eviction. Step 314 is targeting placement of the evicted unstable data to an SSD or SSDs based on relative writability. Specifically, the data is placed on the SSD or SSDs that have the greatest relative writability and other SSDs are excluded from being targets. Step 316 is selecting donor drives to contribute stable data for storage in the space freed by the evictions of unstable data. Specifically, the SSD or SSDs having the greatest relative writability are selected to donate stable data and other SSDs are excluded from being donors.

Unlike other wear-levelling techniques, the technique described above leverages normal functions and capabilities of embedded filesystems and accounts for drive storage capacity and relative writability rather than simply remaining wear-life. The result may be a more efficient, even distribution of wear in a local storage system in which SSDs of different sizes are installed.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
   calculating, for each drive of a plurality of drives in a drive array characterized by the drives having different non-volatile storage capacities, where the storage capacities include both utilized and unutilized storage space, writability as a product of remaining drive wear-life in terms of a remaining percentage of total lifetime endurance at measured drive writes per day and drive capacity including both utilized and unutilized storage space;
   calculating relative writability of each of the plurality of drives relative to other ones of the plurality of drives, including calculating that a first drive of the plurality of drives has greatest relative writability;
   using stability information to select unstable data for eviction from a second drive and select stable data to be stored on the second drive, wherein stable and unstable are predetermined characteristics indicative of likelihood of data change and the unstable data is more likely to be changed than the stable data;
   selecting a third drive as a migration target for the unstable data based on relative writability of the third drive being greater than relative writability of the second drive, wherein the third drive is characterized by less remaining wear-life than the second drive;
   selecting the third drive as a migration donor for the stable data based on relative writability of the third drive being greater than relative writability of the second drive;
   migrating the unstable data from the second drive to the third drive;
   migrating the stable data from the third drive to the second drive;
   and
   selecting the first drive as a target for write input-output operations (IOs) from host servers based on relative writability of the first drive being greater than any drive of the plurality of drives.

2. The method of claim 1 further comprising calculating relative writability as writability of the drive divided by total writability of the plurality of drives.

3. The method of claim 1 further comprising selecting the second drive of the plurality of drives based on remaining wear-life satisfying a threshold.

4. An apparatus comprising:
   a plurality of drives of a drive array characterized by the drives having different non-volatile storage capacities, where the storage capacities include both utilized and unutilized storage space; and
   a compute node comprising a processor, memory, and an operating system with an embedded filesystem configured to:
     calculate writability of each drive of the plurality of drives as a product of remaining drive wear-life in terms of a remaining percentage of total lifetime endurance at measured drive writes per day and drive capacity including both utilized and unutilized storage space;
     calculate relative writability of each of the plurality of drives relative to other ones of the plurality of drives, including calculating that a first drive of the plurality of drives has greatest relative writability;
     use stability information to select unstable data for eviction from a second drive and select stable data to be stored on the second drive, wherein stable and unstable are predetermined characteristics indicative of likelihood of data change and the unstable data is more likely to be changed than the stable data;
     select a third drive as a migration target for the unstable data based on relative writability of the third drive being greater than relative writability of the second drive, wherein the third drive is characterized by less remaining wear-life than the second drive;
     select the third drive as a migration donor for the stable data based on relative writability of the third drive being greater than relative writability of the second drive;
     migrate the unstable data from the second drive to the third drive;
     migrate the stable data from the third drive to the second drive; and
     select the first drive as a target for write input-output operations (IOs) from host servers based on relative writability of the first drive being greater than any drive of the plurality of drives.

5. The apparatus of claim 4 further comprising the compute node configured to calculate relative writability as writability of the drive divided by total writability of the plurality of drives.

6. The apparatus of claim 4 further comprising the compute node configured to select the second drive of the plurality of drives based on remaining wear-life satisfying a threshold.

7. A non-transitory computer-readable storage medium storing instructions that when executed by a computer cause the computer to perform a method comprising:
   calculating, for each drive of a plurality of drives in a drive array characterized by the drives having different non-volatile storage capacities, where the storage capacities include both utilized and unutilized storage space, writability as a product of remaining drive wear-life in terms of a remaining percentage of total lifetime endurance at measured drive writes per day and drive capacity including both utilized and unutilized storage space;
   calculating relative writability of each of the plurality of drives relative to other ones of the plurality of drives, including calculating that a first one of the plurality of drives has greatest relative writability;
   using stability information to select unstable data for eviction from a second drive and select stable data to be stored on the second drive, wherein stable and unstable are predetermined characteristics indicative of likelihood of data change and the unstable data is more likely to be changed than the stable data;

selecting a third drive as a migration target for the unstable data based on relative writability of the third drive being greater than greater than relative writability of the second drive, wherein the third drive is characterized by less remaining wear-life than the second drive;

selecting the third drive as a migration donor for the stable data based on relative writability of the third drive being greater than relative writability of the second drive;

migrating the unstable data from the second drive to the third drive;

migrating the stable data from the third drive to the second drive; and selecting the first drive as a target for write input-output operations (IOs) from host servers based on relative writability of the first drive being greater than any drive of the plurality of drives.

8. The non-transitory computer-readable storage medium of claim 7 wherein the method further comprises calculating relative writability as writability of the drive divided by total writability of the plurality of drives.

9. The non-transitory computer-readable storage medium of claim 7 wherein the method further comprises selecting the second drive of the plurality of drives based on remaining wear-life satisfying a threshold.

* * * * *